US012277931B2

(12) United States Patent
Tang et al.

(10) Patent No.: US 12,277,931 B2
(45) Date of Patent: Apr. 15, 2025

(54) PREDICTIVE QUERY EXECUTION

(71) Applicant: Comcast Cable Communications, LLC, Philadelphia, PA (US)

(72) Inventors: Raphael Tang, Washington, DC (US); Karun Kumar, Hyattsville, MD (US); Kendra Chalkley, Portland, OR (US); Wenyan Li, Arlington, VA (US); Liming Zhang, Reston, VA (US); Gefei Yang, Annadale, VA (US); Yajie Mao, Arlington, VA (US); Jun Ho Shin, Gaithersburg, MD (US); Geoffrey Murray, Bethesda, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 808 days.

(21) Appl. No.: 17/454,234

(22) Filed: Nov. 9, 2021

(65) Prior Publication Data

US 2023/0142836 A1 May 11, 2023

(51) Int. Cl.
*G10L 15/00* (2013.01)
*G06F 16/432* (2019.01)
*G06F 16/683* (2019.01)
*G10L 15/16* (2006.01)
*G10L 15/197* (2013.01)
(Continued)

(52) U.S. Cl.
CPC .......... *G10L 15/197* (2013.01); *G06F 16/433* (2019.01); *G06F 16/685* (2019.01); *G10L 15/16* (2013.01); *G10L 15/22* (2013.01); *G10L 15/30* (2013.01)

(58) Field of Classification Search
CPC .......... G06F 3/016; G06F 3/16; G06F 16/685; G10L 15/07; G10L 15/20; G10L 15/22; G10L 15/26; G10L 15/30; G10L 15/02; G10L 15/063; G10L 15/08; G10L 15/16; G10L 15/14; G10L 15/197; G10L 15/1815; G10L 15/12; G10L 15/00; G10L 15/10; G10L 15/1512; G10L 25/27; G10L 25/30; G10L 25/78; G10L 25/87; G10L 19/005;
(Continued)

(56) References Cited

U.S. PATENT DOCUMENTS

2016/0148610 A1   5/2016   Kennewick, Jr. et al.
2017/0221486 A1   8/2017   Kurata et al.

OTHER PUBLICATIONS

Mitra et al., "Query Auto-Completion for Rare Prefixes", Oct. 2015, pp. 1755-1758.
(Continued)

*Primary Examiner* — Vu B Hang
(74) *Attorney, Agent, or Firm* — BakerHostetler

(57) ABSTRACT

First audio data associated with a first portion of a voice query (e.g., an incomplete voice query) may be received (e.g., by a device or a server). A first transcript may be determined by a speech recognition engine and based on the first audio data. A plurality of predicted queries may be determined by applying a prediction process to the first transcript. A response for each of the plurality of predicted queries may be determined by processing the plurality of the predicted queries. Second audio data associated with a second portion of the voice query (e.g., a complete voice query) may be received. A second transcript may be determined by the speech recognition engine and based on the second audio data. Based on comparing the second transcript to one of the plurality of predicted queries, a response for the voice query may be returned.

24 Claims, 6 Drawing Sheets

(51) Int. Cl.
*G10L 15/22* (2006.01)
*G10L 15/30* (2013.01)

(58) Field of Classification Search
CPC ... G10L 19/00; G10L 15/1822; G10L 15/183; G10L 15/193; G10L 15/19; G10L 13/00
See application file for complete search history.

(56) References Cited

OTHER PUBLICATIONS

Park et al., "A Neural Language Model for Query Auto-Completion", SIGIR, Aug. 2017, pp. 1189-1192.
Tang et al., "Voice Query Auto Completion", Proceedings of the 2021 Conference on Empirical Methods in Natural Language Processing, Nov. 2021, pp. 900-906.

PREDICTIVE QUERY EXECUTION

BACKGROUND

Speech recognition engines may be used to provide speech-based services for television and other areas, for example, by allowing users to control their television control devices or other control devices by speaking into their cellular telephones or into a hand-held remote control of the television or other control device. However, latency issues persist and improvement to speech recognition processing is desirable.

SUMMARY

Methods and systems are described for decreasing voice search latency on speech-enabled systems. Query auto completion (QAC) may be used to autocomplete an intermediate transcription to obtain a predicted voice query before a user finishes speaking. Thus, as a query is progressively received, a remainder of the query may be continuously predicted to generate one or more predicted queries. The one or more predicted queries may be processed prior to receiving an entirety of the actual query. Auto completions may be passed through downstream components and one or more subsequent system responses may be cached. If the final query is similar to or matches any of the pre-processed auto completions, the cached response may be returned immediately, saving overall system latency and improving user experience. Accordingly, the described methods and systems may decrease voice search latency and reduce average processing times for voice queries.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Voice search platforms are often tangled pipelines of heterogeneous subsystems, with numerous dependencies between speech recognition engines, query routing stacks, and information retrieval systems, among other components. Automatic speech recognition (ASR) systems, which transcribe a user's speech, regularly represent one of the first upstream components in voice search. It has been believed that, without the complete transcription of the user's speech, it was not possible to begin the lengthy process of understanding user intent or information need.

Disclosed herein are systems and methods for utilizing query auto completion (QAC) in a voice search setting to reliably autocomplete an intermediate text (e.g., or transcription of a partial query) to obtain a predicted voice query before the user finishes speaking. This predictive capability helps improve overall system latency. By following the execution, autocompletions may be passed through downstream components and cached for a subsequent system response. Then, if the final query is determined to be similar to or match (e.g., based on a comparison) any of the auto completions, the cached response may be returned immediately, saving overall system latency.

Such a pipeline optimization is meaningful since the downstream components generally reside on separate computational nodes, often involving network calls, large neural networks, and database queries, all of which incur high latency. On one example entertainment system measured, the downstream information retrieval, natural language processing, and action resolution components may take a total of 500-800 ms (e.g., without the disclosed techniques). This delay is far beyond the acceptable 100 ms threshold for an event to be instantaneous by humans and, thus, the overall latency may be reduced by 400-700 ms based on the disclosed techniques.

In a library-of-Babel approach, generating all possible voice queries may be computationally infeasible for the downstream components. Thus, there exists a cost-latency trade-off regarding how many parallel voice queries may be executed for a given amount of latency savings, thus requiring a high-precision model that performs well with just a few calls. Disclosed herein is such a predictive voice query auto completion and predictive query execution system, including ASR system-aware QAC models. As an example, the disclosed system may yield an average processing time savings of 613 ms on the voice queries to the X1 entertainment system.

Figure 1:
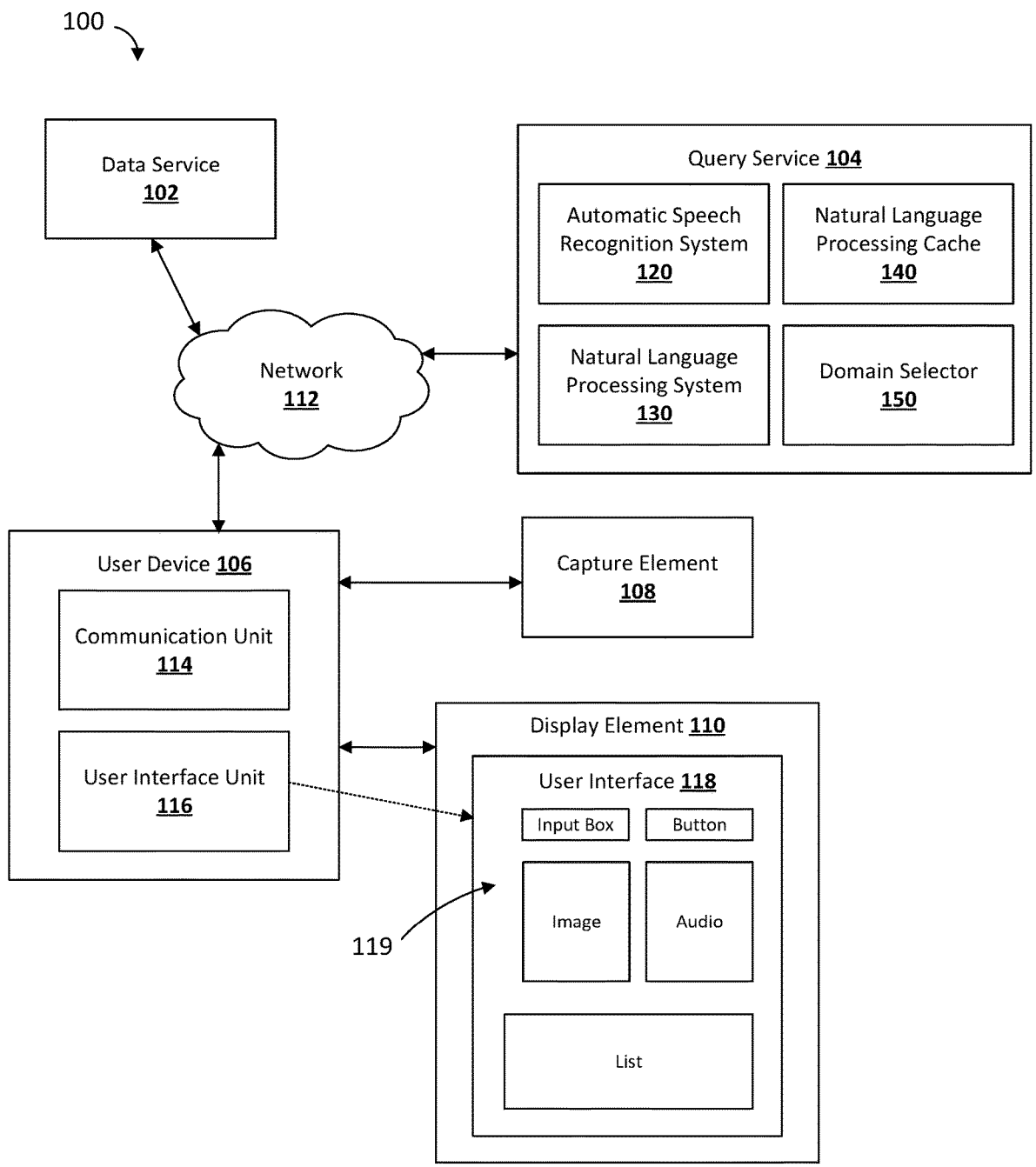
FIG. 1 shows a block diagram of an example system.

Methods and systems are described for decreasing voice search latency on speech-enabled systems (e.g., a voice controlled content device, a voice controlled streaming device, a voice controlled handheld device, etc.). FIG. 1 shows a block diagram of an example system 100 for providing content. The system 100 may comprise a data service 102, a query service 104, a user device 106, a capture element 108, a display element 110, or a combination thereof. The data service 102, the query service 104, and/or the user device 106 may be communicatively coupled via a network 112 (e.g., a wide area network). The user device 106 may comprise the capture element 108 and/or the display element 110. It should be noted that while the singular term device is used herein, it is contemplated that some devices may be implemented as a single device or a plurality of devices (e.g., via load balancing). In some scenarios, the capture element 108 and/or the display element 110 may be separate devices from the user device 106. The user device 106 may be communicatively coupled to the capture element 108 and/or display element 110 via the network, a wired connection, a cable, or another network (e.g., a local area network). Any device disclosed herein may be implemented using one or more computing nodes, such as virtual machines, executed on a single device and/or multiple devices.

The network 112 may comprise a content distribution and/or access network. The network 112 may facilitate communication via one or more communication protocols. The network 112 may comprise fiber, cable, a combination thereof, and/or the like. The network 112 may comprise wired links, wireless links, a combination thereof, and/or the like. The network 112 may comprise routers, switches, nodes, gateways, servers, modems, and/or the like.

The data service 102 may be configured to store data associated with one or more services. The data may comprises sales data, service data, business data, user data, usage data, vendor data, employee data, infrastructure data, financial data, data associated with content (e.g., video, audio, images, text), a combination thereof, and/or the like. The data service 102 may comprise one or more servers. The data service 102 may comprise one or more data stores, such as one or more databases. The data service 102 may be configured to allow access (e.g., via the network 112) to the data to one or more user devices, such as the user device 106. The data service 102 may be configured to retrieve the data based on one or more supported query languages, such as relational query languages, non-relational query languages, structured query language (SQL), presto, hive, cypher query language, MongoDB, and/or the like.

The user device 106 may be configured to receive the data from the data service 102. The user device 106 may comprise a computing device, smart device (e.g., smart glasses, smart watch, smart phone), a mobile device, a tablet, a computing station, a laptop, a digital streaming device, a set-top box, a streaming stick, a television, and/or the like.

The user device 106 may be configured to receive the data via a communication unit 114. The communication unit 114 may comprise a modem, network interface, and/or the like configured for communication via the network 112. The communication unit 114 may be configured to communicatively couple (e.g., via a local area network, a wireless network) the user device 106 to the capture element 108, the display element 110, a combination thereof, and/or the like.

The capture element 108 may be configured to capture user input. The user input may be detected and used to generate capture data (e.g., audio data). The capture data may be sent to the user device 106, the query service 104, or a combination thereof. The capture element 108 may comprise an audio capture element, such as a microphone. The capture element 108 may be comprised in a remote control, in the user device 106, in a smart device (e.g., smart glasses, smart watch), a speaker, a virtual assistant device, a combination thereof, and/or the like. The capture element 108 may generate the capture data based on detection of a trigger, such as a button press, recorded audio matching a phrase or keyword, a combination thereof, and/or the like.

The user device 106 may comprise a user interface unit 116. The user interface unit 116 may comprise an application, service, and/or the like, such as a content browser. The user interface unit 116 may be configured to cause display of a user interface 118. The dotted line in FIG. 1 indicates that the user interface unit 116 may cause rendering of the example user interface 118 on the display element 110. The user interface unit 116 may receive (e.g., via the network 112) user interface data from an application service (e.g., hosted on the network 112). The user interface data may be processed by the user interface unit 116 to cause display of the user interface 118. The user interface 118 may be displayed on the display element 110. The display element 110 may comprise a television, screen, monitor, projector, and/or the like.

The user interface 118 may be configured to allow the user to browse, navigate, access, and/or the like available data, such as data from the data service 102. The user interface 118 may comprise a plurality of interface elements 119. The plurality of interface elements 119 may allow for the data to the presented via the user interface 118. The plurality of interface elements 119 may provide a search interface, a content interface, an entertainment interface, a premises management interface, or a browsing interface. The plurality of interface elements 119 may be configured to present the data in a variety of forms, such as a text (e.g., in a list element, text element), a chart and/or graph (e.g., in an image element or other graphic module), audio data (e.g., audio playback element), a combination thereof, and/or the like. The plurality of interface elements 119 may comprise menu items for navigation of different views of the data. The plurality of interface elements 119 may comprise actionable interface elements, such as interface elements that may be clicked or otherwise interacted with to cause an action. The actions may include navigating to a resource, performing a search, modifying playback of a content item, retrieving a resource, modifying a configuration, or preforming a predefined process. An interface element may comprise an image, button, dropdown menu, slide bars, or any other kind of interactive element that may be used to select content.

The query service 104 may be configured to process requests (e.g., speech queries) associated with the data service 102. The query service 104 may be configured to process a speech query based on the techniques described herein, such as the methods of FIGS. 2-5, and/or the like. The query service 104 may be configured to receive data indicative of a request (e.g., a speech query). The query service 104 may receive the data indicative of the speech query from the user device 106. A user may speak a request that may be detected by the capture element 108. The capture element 108 may generate capture data (e.g., audio data) indicative of the speech query. The capture data may be sent to the query service 104 as the data indicative of the speech query. In some scenarios, the user device 106 may be configured to translate the capture data into text data comprising the query or text. In other scenarios, the capture data may be translated by the query service 104.

The query service 104 may comprise an automatic speech recognition (ASR) System 120, a Natural Language Processing (NLP) system 130, an NLP Cache 140, and/or a domain selector 150. The query service 104 and/or one or more components of the query service 104 may be located in a server, an edge server, a gateway, a streaming device, a set-top box, a television, a mobile device, or any combination thereof.

The ASR System 120 may be configured for performing speech recognition processing on one or more voice queries to provide transcriptions of the one or more voice queries. The ASR System 120 may generate text for a query as a query is spoken, e.g., a streaming voice query. The ASR System 120 may generate intermediate text for a portion of a voice query. The ASR System 120 may generate a final text for the query, e.g., after a user has finished speaking. Speech recognition may be done in a variety of ways and at different levels of complexity, for example, using one or more of pattern matching, pattern and feature analysis, and language modeling and statistical analysis, as discussed further herein. However, it is understood that any type of speech recognition may be used, and the examples provided herein are not intended to limit the capabilities of the ASR System 120.

As a further explanation of the speech recognition techniques above, pattern matching may comprise recognizing each word in its entirety and employing a pattern matching algorithm to match a limited number of words with stored reference speech patterns. An example of pattern matching is a computerized switchboard. A person who calls a bank may encounter an automated voice message (e.g., from an interactive voice response system) instructing the user to say "one" for account balance, "two" for credit card information, or "three" to speak to a customer representative. In this example, the stored reference speech patterns (e.g., a reference sound file) may comprise multiple reference speech patterns for the words "one," "two," and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into smaller portions and recognizing the portions from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

The NLP System 130 may be configured to process one or more audio transcriptions. The audio transcriptions may be received from the ASR System 120 and/or may be stored transcriptions received directly from a server or device (e.g., user device 106, a gateway device in communication with the user device 106). A first type of transcription may be a transcription that is capable of being processed at an NLP Cache 140. The audio file may be compared to a plurality of data entries associated with the NLP Cache 140 in order to determine an operation associated with the voice query. The data entries associated with the NLP Cache 140 may correspond to known (e.g., preset, predefined entries) voice queries, such as popular voice queries associated with a content server. In some instances, a voice transcription may require language modeling and statistical analysis to recognize the voice query associated with the audio file. Incomplete transcriptions may be difficult to accurately complete or identify, and additional processing may be necessary to determine an entirety of a user's voice query or accurately identify a user's intention. Moreover, incomplete transcriptions may not have corresponding data entries stored in the NLP Cache 140 for determining an intended operation associated with the transcription.

Language modeling and statistical analysis is a more sophisticated speech recognition method in which knowledge of grammar and the probability of certain words or sounds following one from another is used to speed up recognition and improve accuracy. Complex voice recognition systems may comprise a vocabulary of over 50,000 words. Language models may be used to give context to words by analyzing the words proceeding and following the word in order to interpret different meanings the word may have. Language modeling and statistical analysis may be used to train a speech recognition system in order to improve recognition of incomplete voice queries or transcriptions.

In an example, users may interact with a user interface of an entertainment platform (e.g., user interface 118) and may search through an entertainment catalog using a voice-based remote control. Audio from user device 106 may pass through ASR System 120. For example, ASR System 120 may be a multi-stage system. A first stage of a two-stage ASR system may comprise a low-latency, limited command neural classification system (e.g., AudioCache). A second stage of a two-stage ASR system may comprise a third-party ASR system for cases which cannot be handled by the limited command neural classification system.

In another example, users may use voice-based queries or commands to interact with a user interface of (e.g., user interface 118) one or more premises devices of a premises management system. The premises may be a customer premises. The premises may include an area within a coverage range (e.g., wireless range) of the user device 106. The premises may comprise a property, dwelling, terminal, building, floor, and/or the like. The premises may comprise different rooms, walls, door, windows, and/or the like. The user device 106 may move within the premises and/or outside of the premises.

One or more premises devices may be located at the premises. The one or more premises devices may comprise one or more of a camera, a sensor, a security system, a security controller, a gateway device, a smoke detector, a heat sensor, infrared sensor, infrared emitter, infrared camera, a door sensor, a motion sensor, a window sensor, a thermostat, a microphone, a personal assistant, a door lock, an irrigation device, or a combination thereof. The one or more premises devices may be configured to generate premises data. The premises data may comprise a sensor state, a setting, audio, video, images, text information, premises mode, or a combination thereof. The premises data may comprise thermal data, such as heat sensor data, data of an infrared sensor (e.g., data for each of a plurality of pixels of the sensor), a thermal signature, a combination thereof, and/or the like. The one or more premises devices may be configured to send the premises data to the data service 102 or the user device 106, or a combination thereof.

In another example, users may use voice-based queries or commands to interact with a voice controlled device (e.g., user device 106). A voice controlled device may comprise a smart speaker, such as a device comprising a speaker, a computer processor (e.g., or micro-controller), and a microphone. The voice controlled device may be configured to receive voice commands from users. Voice commands may comprise any command, such as buying a product, adding an item to a list, playing music, providing an answer to a question (e.g., via querying a search engine), and/or the like.

The transcription (e.g., intermediate text, final text) from ASR System 120 may be sent (e.g., via network 112, or local network) to Domain Selector 150. Domain Selector 150 may choose the most appropriate domain in which to execute the command, such as a television domain (e.g., for channel tunes) or a home domain (e.g., for internet-of-things, premises devices, security devices, automation devices, and/or like commands). The request may then be forwarded to an NLP System 130 (e.g., domain-specific) which may provide intent classification and action resolution for the command (e.g. may take 500-799 ms). In a final step of the process, a response from NLP System 130 may be fed to an execute agent of the domain, to resolve the command.

The query service 104 may be configured to use query auto complete (QAC). Query auto completion may comprise predicting a user's complete query given a present incomplete prefix (e.g., portion) of the query. For example, if a user types "COVID vaccine." A QAC system may propose most likely completions for a prefix, e.g., "COVID vaccine near me," saving a user time when the prediction is correct.

Conventional QAC approaches may generate completions using language models conditioned on the prefix, with simple prefix trees serving as a strong baseline. However, in a streaming voice search setting, naively adapting QAC approaches may fail because the key assumptions may differ. For example, incomplete queries may comprise partial speech, which may be different from partial text. Partial speech may be transcribed differently and yield confusing transcriptions, whereas partial text may simply appear to be missing portions of text. In place of human users, an ASR system may generate the textual transcriptions, resulting in intermediate queries that may not form prefixes or even substrings of the final query. Consider the voice query "Hulu" as an example. Passing it through a streaming ASR system, the transcriptions "Who" is first observed and then "Hulu." Traditional QAC approaches (e.g., given only orthographic prefixes) may fail to complete the final transcription, as the true prefix is phonetic and phonetic representations are generally unavailable to these models.

Voice queries issued by users may be predicted by the query service 104. The voice queries may include some mid-utterance and/or intermediate transcriptions of incomplete speech from the ASR system 120. The ASR system 120 may be a streaming system, e.g., with the speech being transcribed to text in real time (e.g., or near-real time, as a query is spoken by a user, upon detection of receipt of audio associated with at least a part of a voice query). Audio data for parts of a query may be sent as the audio is capture to the ASR system 120.

The query service 104 may send the determined request to the data service 102. The data service 102 may be configured to process the request to determine search results. The search results may be sent to the user device 106. The search results may be displayed on the display element 110. The search results may be displayed as one or more of the pluralities of interface elements 119. The search results may be displayed as a list of results, a chart, graph, and/or the like.

Figure 2:
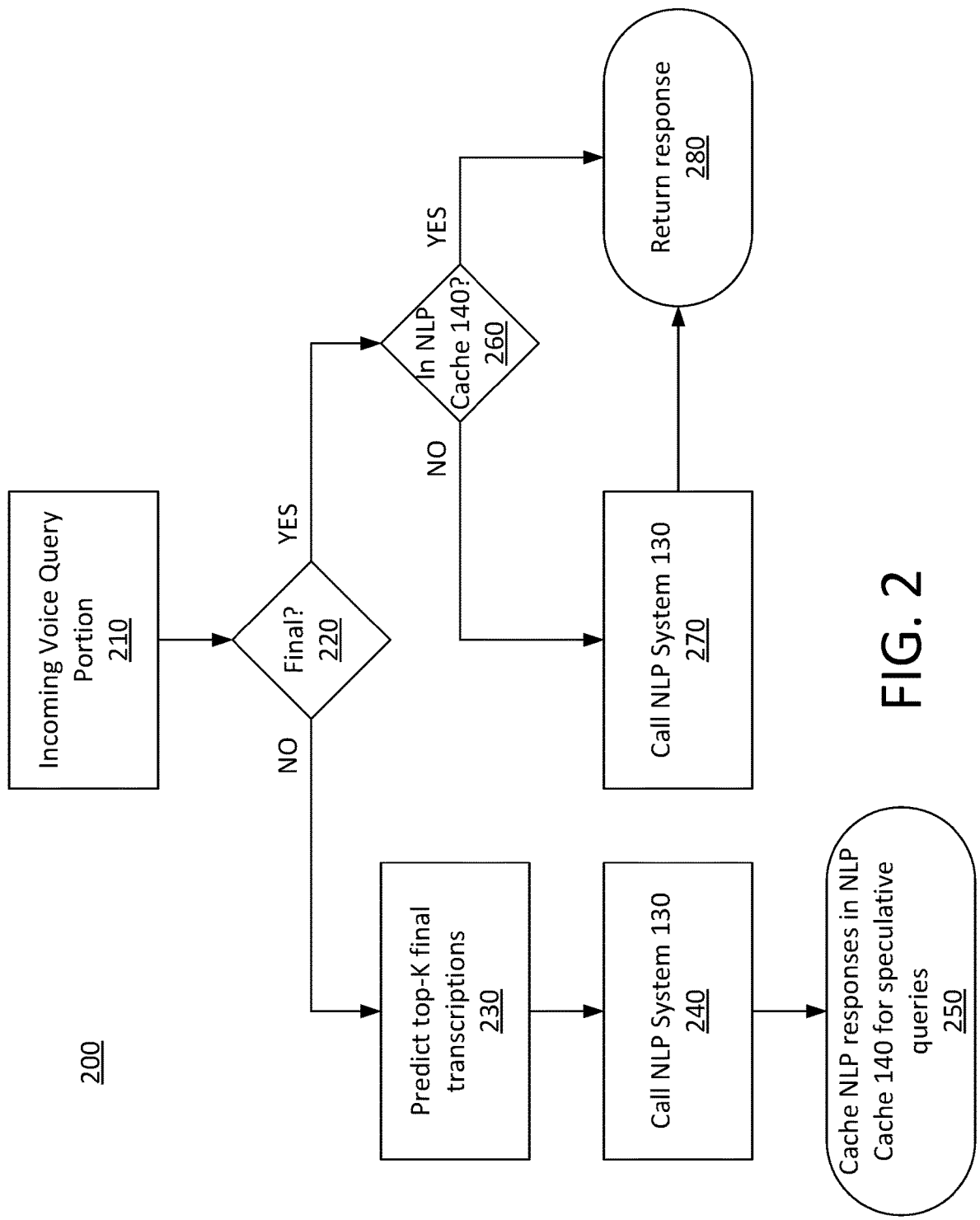
FIG. 2 shows a flow chart of an example method.

FIG. 2 shows a flow chart of an example method 200. The method 200 may be implemented by the user device 106, query service 104, data service 102, a computing device at a premises (e.g., gateway, streaming device, voice controlled device), or a combination thereof. At step 210, an incoming voice query portion (e.g., chunk) is received. At step 220, it may be determined if the incoming voice query portion is a final transcription (e.g., a complete transcription of a completed voice query). A final transcription may comprise a complete voice query, e.g., where a user has finished speaking. For example, the incoming voice query may be compared to a database of complete queries to determine if the incoming voice query portion is a final transcription. As another example, a pause in the voice query (e.g., that exceeds a threshold amount of time) may be used to determine if the incoming voice query portion is a final transcription. A user input may serve as an indication that an incoming voice query portion is a final transcription. For example, a user may press a button on a remote while making a voice query and may release the button when the query is complete.

If the incoming voice query portion is not a final transcription, the method 200 may, at step 230, predict one or more ranked transcriptions (e.g., top-K final transcriptions), where the ranked transcriptions may be ordered based on their relevance to the incoming voice query portion. The method 200 may then, at step 240, call the NLP System 130. At step 250, the method 200 may cache NLP responses in NLP Cache 140 for predicted queries. This may decrease voice search latency and reduce average processing times for voice queries by continuously predicting the most likely queries that will issue at step 230. The method 200 may generate precomputed responses by processing predicted queries before they finish speaking at step 240 and/or step 250. Moreover, by processing predicted queries, the precomputed responses may be generated prior to determining the incoming voice query portion is a final transcription. Since downstream components associated with processing queries may reside on separate computational nodes and often involve network calls, large neural networks, and database queries (e.g., all of which incur high latency), passing precomputed responses through downstream components and caching the precomputed responses (e.g., prior to completion of the query) for a subsequent system response may significantly reduce overall system latency.

It follows that efficiency of returning a response to the final transcription may be greatly increased by comparing the final transcription to one of the predicted queries. Based on the comparison, one of the predicted queries may be selected based on one or more similarities to the final transcription. The precomputed response may be returned for the selected predicted query. Due to overall system latency, this may represent a significant improvement over systems that do not begin processing a query until the final transcription has been received. In other words, in comparison to processing a query after receiving the final transcription, there may be far fewer computational nodes, network calls, database queries, etc. involved with comparing the final transcription to the predicted queries and retrieving a cached precomputed response associated with the predicted query that is similar to (e.g., matches) the final query. On one example entertainment system measured, the time to process a query after the query is complete took a total of 500-800 ms (e.g., including the downstream information retrieval, natural language processing, and action resolution components). However, comparing the complete query to the predicted queries and returning the precomputed response for associated with the predicted query that is similar to (e.g., matches) the final query took less than 100 ms (e.g., the threshold for an event to be instantaneous by humans).

At step 220, if it is determined that the incoming voice query portion is a final transcription, then the method proceeds to step 260. At step 260 it is determined whether the final transcription is in the NLP Cache 140. If the final transcription is not in the NLP Cache 140, the method 200 may call the NLP System 130 at step 270. At step 280, the method 200 may return a response. At step 260, if the method 200 determines the final transcription is in the NLP cache 140, the method 200 may return the response at step 280. Thus, once the query is finished, if the final query is similar to (e.g., matches) any of the predicted queries at step 260, a precomputed response may be returned immediately at step 280.

The following illustrates an example implementation of the present disclosure. It should be understood that the disclosure is not limited to this specific implementation but the example is only given for purposes of illustration.

Final voice queries issued by users may be predicted, given some mid-utterance, based on intermediate transcriptions of their incomplete speech from the ASR system 120 (e.g., a streaming ASR System, with the speech being transcribed to text at the actual time during which the speech is spoken). A query portion may comprise an utterance u of length k which may include a k-tuple of string transcriptions $X(u):=(x(1), x(2), \ldots, x(k))$ representing the streaming outputs of the ASR system 120 across the utterance, where $x(i) \in V|x(i)|$ over the alphabet V for i=1 to k. For example, X(u) may be indexed in chronological order, (e.g., "C", "Sea Whirl", "Sea World") for the utterance "SeaWorld." For each $1 \leq j \leq k$, x(k) may be predicted from x(j) by modeling $p(x(k)|x(1), \ldots, x(j))$. According to some examples, a simplifying assumption may be made based on preliminary exploration, e.g., $p(x(k)|x(1), \ldots, x(j))=p(x(k)|x(j))$. For example, the simplifying assumption may state that an intermediate transcription captures sufficient context from its preceding intermediates.

According to some examples, a voice query oriented QAC approach (e.g., statistical method or neural approach)

may be favored over a keyboard-input QAC. In a keyboard-input QAC, x(i) is typically a character level prefix of x(i+1) for all i=1 to k−1, e.g., ("rest", "restaurants", "restaurants nearby"). Such keyboard-input QAC may be expressed as (x(k)|x(j))=p(x(k)), the predictive distribution of which may be modeled with one or more prefix trees and autoregressive language models over the tokens of the final query x(k).

Conditioned Most Popular Completion (MPC)

In keyboard-input approaches, MPC may be used to model a probability, p(x(k)). A prefix tree may be constructed over the characters of x(k) across each query in the training corpus, keeping track of the query frequency. At an inference time, given some prefix $x(k)_{1:j}^{(k)}$ for some 1≤k, the top-K completions from the prefix tree may be returned. For example, p(x(k)|x(j)) may be modelled using prefix trees. A separator token [SEP] may be introduced in the following function: $f(X^{(u)}, j):=x^{(j)} \oplus [SEP] \oplus x^{(k)}$, where $\oplus$ denotes string concatenation and $X^{(u)}$ is a k-tuple of strings as previously defined.

A training set may be constructed from a training corpus of N utterances. The training set may be denoted as $\mathcal{D}:=(u1, u2, \ldots, uN)$ as $\mathcal{D}':=\{f(X^{(ui)}, j):u_i \in \mathcal{D}\ 1 \leq j \leq k_i\}$. For each utterance in the dataset, each intermediate transcription (e.g., including the last) may be concatenated with the final one. Finally, a prefix tree may be constructed over $\mathcal{D}'$. At inference time, given the lookup transcription x, [SEP] may be appended to it for x':=x⊕[SEP], then the top-K completions of x' after [SEP] may be returned from the prefix tree. According to some examples, this may be references as "conditioned MPC" or "CondMPC".

Backspacing Neural Language Models

However, MPC may also have drawbacks, e.g., failing to complete unseen prefixes. As a workaround of potential drawbacks associated with MPC, $p(x^{(k)})$ may be modelled as a neural language model (NLM) rather than an observed distribution. By employing an NLM, unseen suffixes may be generated. However, there may still be issues if the prefixes remain fixed, e.g., issues resulting from incomplete queries (e.g., partial speech).

According to some examples, a conditional probability, $p(x^{(k)}|x^{(j)})$, may be modelled using autoregressive NLMs. It may be observed that the most common reformulation by the ASR system across an utterance is the deletion of some trailing words and the emission of zero or more new words. For example, for the utterance "YouTube jungle," reformulations may include "YouTube," "YouTube john," "YouTube," and "YouTube jungle." This particular dynamic may be useful for more efficient NLMs, since it may reduce the overall sequence length.

According to some examples, a natural language model, $\psi(p, s)$, may be defined by the following equation: $\psi(p, s):=\min(\{i: p_i \neq s_i\} \cup \{|p|+1\})$ where p and s are strings. This operation produces the first index in p where the prefix p does not match s. A backspace token [<] may represent a single-token deletion, as defined by the following equation: $g(X, j):=x^{(j)} \oplus ([<])|x^{(j)}|-m \oplus x(k)_{m:}^{(k)}$, where $m:=\psi(x^{(j)}, x^{(k)})$ and raising a string token to an exponent a denotes a repetition of a times, with nonpositive a being a no operation (e.g., a "no-op").

Hence, g may provide a string representation of minimum trailing word deletions from the prefix and suffix words to add. For example, X':=("Show", "Show Who", "Show Hulu"), g(X', 1)="Show Hulu" and g(X', 2)="Show Who [<] Hulu." A training set may be built from a corpus $\mathcal{D}$ for each prefix-suffix pair. Based on this training, an efficient, state-of-the-art NLM may be fine-tuned over this training se (e.g., GPT-2 or DistilGPT-2). During inference, given the intermediate transcription x, the top-K most likely completions may be generated using the NLM with beam search decoding. Such an approach may be referred to as a "backspacing neural query language model" or BS-NQLM.

Results

TABLE 1

Test set results (e.g., on an X1 dataset), where unseen and seen splits are relative to CondMPC.

| # | Model | All | | | Seen | | | Unseen | | |
|---|---|---|---|---|---|---|---|---|---|---|
| | | MRR | R@1 | ETS | MRR | R@1 | ETS | MRR | R@1 | ETS |
| 1 | MPC | 0.259 | 0.321 | 468 ms | 0.338 | 0.414 | 473 ms | 0.029 | 0.031 | 53.4 ms |
| 2 | NQLM | 0.190 | 0.241 | 364 ms | 0.197 | 0.237 | 312 ms | 0.045 | 0.065 | 103 ms |
| 3 | CondMPC | 0.315 | 0.389 | 573 ms | 0.416 | 0.516 | 589 ms | 0.0 | 0.0 | 0.0 |
| 4 | BS-NQLM | 0.316 | 0.392 | 566 ms | 0.408 | 0.496 | 571 ms | 0.092 | 0.141 | 229 ms |
| 5 | BS-NQLM + CondMPC | 0.341 | 0.426 | 613 ms | 0.416 | 0.516 | 589 ms | 0.092 | 0.141 | 229 ms |

As illustrated in Table 1, most popular completion (MPC) and neural query language models (NQLMs) are implemented as baselines over the final transcription of each utterance. The computationally efficient DistilGPT-2 is used for all neural query language models, which provides the best latency-quality operating point. The beam search width is limited to 10 and the top-5 results for each query are returned.

To construct the corpus, 110K voice queries are sampled uniformly at random from the Comcast American X1 entertainment system on Mar. 19, 2021, collecting roughly 0.05% of the daily traffic. The voice queries are then sent in 400-millisecond chunks to an ASR system (e.g., a task-specificWav2vec 2.0 model) and the streaming transcriptions are logged by the ASR system. For the training, development, and test splits, the logged queries are split by query into distinct sets of 80%, 10%, and 10% of the corpus, respectively. Training sets are then build for CondMPC and BS-NQLM Mean reciprocal rank (MRR) and recall-at-one (R@1) evaluation metrics are used to assess the models. Additionally, the expected time savings (ETS) given the first timestamp is measured where the correct predictive call is executed, e.g., when the top-5 predictions contain the final transcription.

As presented in Table 1. QAC methods (e.g., MPC or NGLM) may underperform (e.g., relative to CondMPC, BS-NQLM, and BS-NQLM+CondMPC) by 100-150 milliseconds in time saved because the QAC methods do not model the relationship between intermediate transcriptions and the final transcription, underperforming The pure NQLM approaches (e.g., NQLM and BS-NQLM) performs worse than MPC approaches (e.g., MPC and CondMPC) on the seen set, but the MPC fails to generalize to the unseen set, reinforcing a two-stage approach where unseen queries are routed to the NQLM while the MPC handles the seen ones. Such a two-stage approach (e.g., BS-NQLM+CondMPC) performs best across all of the queries.

Moreover, the results confirm that the computational cost of running NQLMs is worth the savings. For example, on average, with no memoization, it takes 68 ms per prediction, which falls below both the threshold for instantaneous perception (e.g., 100 ms) and the 500-600 ms in time savings. The MPC methods are the fastest, comprising a prefix tree traversal and taking less than 10 milliseconds. These latency-quality profiles illustrate that BS-NQLM+CondMPC, combining BS-NQLMs and CondMPCs, yields the best quality on both the seen and the unseen queries.

According to some examples, an optimization method is provided for improving the voice search latency for speech-enabled systems, e.g., SpecX. Improved extensions of QAC to the voice query domain are used to model the dependencies between the intermediate transcription and the final one matters. As shown by real-world data to the X1 entertainment system, it is shown that SpecX yields an average processing time reduction of 613 milliseconds.

Figure 3:
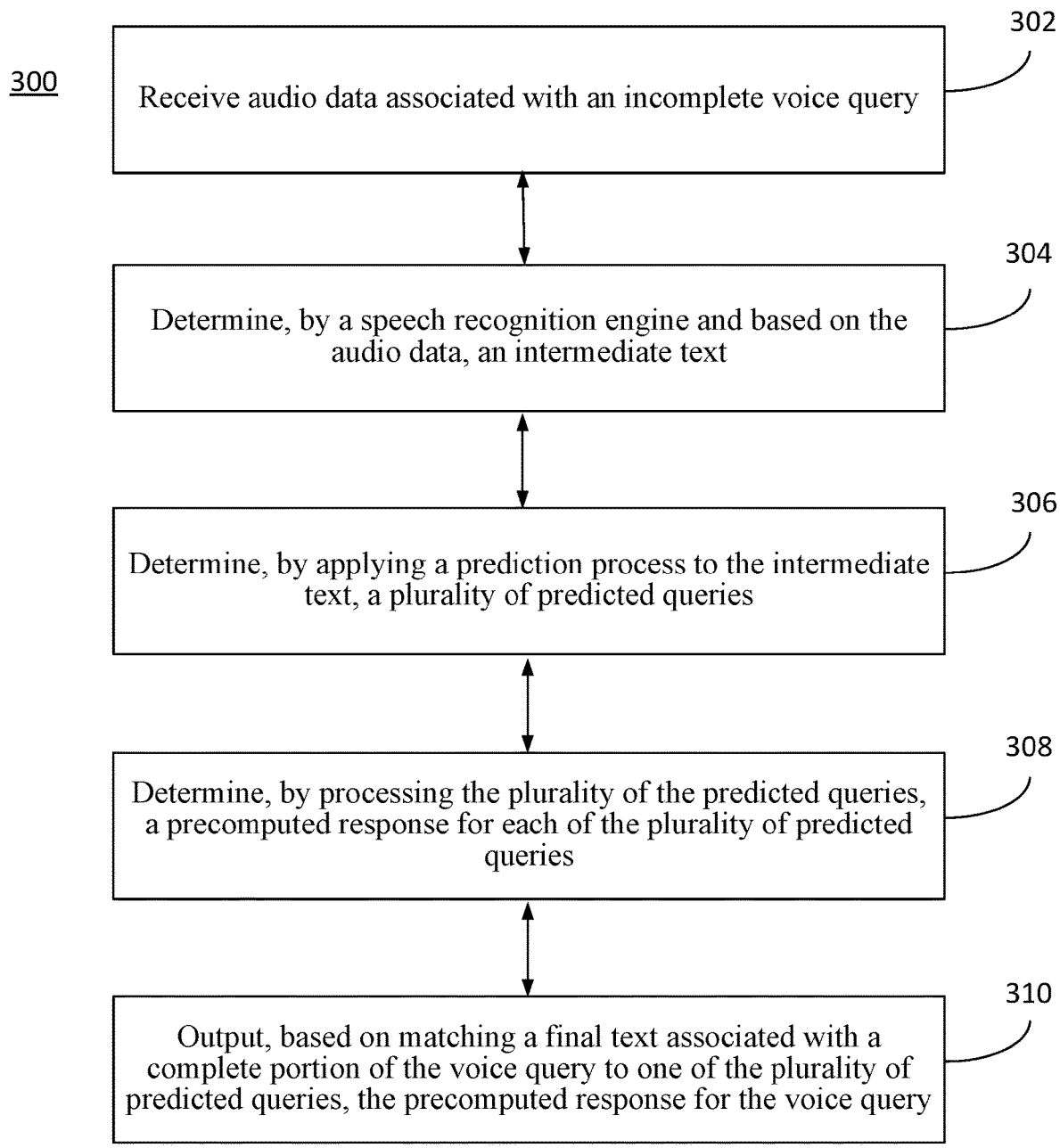
FIG. 3 shows a flow chart of an example method.

FIG. 3 shows a flow chart of an example method 300. The method 300 may be performed by a device (e.g., user device 106, computing device), one or more servers (e.g., query service 104, data service 102), or a combination thereof.

At step 302, first audio data associated with a first portion of a voice query may be received. The first audio data may be received by a device or a server and may comprise an audio file associated with a voice query from a user. The voice query may be spoken by a user and may be recorded by a microphone at a device. The voice query may comprise a voice command, such as buying a product, adding an item to a list, playing music, providing an answer to a question (e.g., via querying a search engine), and/or the like. The first portion of the voice query may be an incomplete voice query.

At step 304, a first transcript may be determined by a speech recognition engine. The first transcript may comprise text and may be determined based on the first audio data. The first transcript may be based on speech being transcribed to text in real time (e.g., or near-real time, as a query is spoken by a user, upon detection of receipt of audio associated with at least a part of a voice query). The first transcript may be an intermediate text. For example, additional text may follow the intermediate text. It may be determined that the first transcript comprises partial speech (e.g., based on a probability distribution, confidence threshold, etc.).

At step 306, a plurality of predicted queries may be determined (e.g., by a user device or a server). The plurality of predicted queries may be determined by applying a prediction process to the first transcript. A prefix tree (e.g., a trie) may be constructed for the first transcript (e.g., based on determining the first transcript comprises partial speech). The prefix tree may comprise a tree data structure used for locating specific keys (e.g., text strings for the first transcript) from within a set of keys. Links between nodes of the tree data structure may be defined by individual characters. Moreover, a separator token may be introduced into the prefix tree. An autoregressive neural language model (NLM) may be constructed for the first transcript (e.g., one or more completions of the partial speech from the prefix tree). The autoregressive NLM may provide a string representation of one or more minimum trailing word deletions from a prefix associated with the first transcript. Moreover, a backspace token may be introduced into the autoregressive NLM.

At step 308, a response (e.g., precomputed response or preprocessed response) for each of the plurality of predicted queries may be determined. The responses may be determined by processing (e.g., prior to completion of the incomplete voice query) the plurality of the predicted queries. The responses may comprise responses to one or more commands, such as a product for purchase, addition of an item to a list, control of music, changing a channel or application, playing a show, requesting one or more answers to a question (e.g., to be returned by a search engine), and/or the like. By processing the responses for each of the plurality of predicted queries, processing time for a final query may be reduced because the query is being processed before it is complete.

At step 310, second audio data associated with a second portion of a voice query may be received. The second audio data may be received by a device or a server and may comprise an audio file associated with a voice query from a user. The second portion of the voice query may comprise a complete voice query. A complete portion of the voice query may comprise the first portion of the voice query and the second portion of the voice query. The second portion (e.g., associated with the second audio data) may comprise the first portion (e.g., associated with the first audio data). The second portion (e.g., associated with the second audio data) may be additive to or incremental to the first portion (e.g., associated with the first audio data). The voice query may be spoken by a user and may be recorded by a microphone at a device. The voice query may comprise a voice command, such as buying a product, adding an item to a list, playing music, providing an answer to a question (e.g., via querying a search engine), and/or the like.

At step 312, a second transcript may be determined by the speech recognition engine. The second transcript may be determined based on the second audio data. The second transcript may be based on speech being transcribed to text in real time (e.g., or near-real time, as a query is spoken by a user, upon detection of receipt of audio associated with at least a part of a voice query). The second transcript may comprise a complete text. For example, no additional text may follow the complete text. It may be determined that the second transcript comprises complete speech (e.g., based on a probability distribution, confidence threshold, etc.).

At step 314, a response for the voice query may be output. The response to the voice query may correspond to the one of the plurality of predicted queries (e.g., the one that is similar to or matches the second transcript). The response for the voice query may be output based on comparing the second transcript (e.g., a final text associated with the second portion of the voice query) to the plurality of predicted queries and selecting, based on the comparison, one of the plurality of predicted queries as a matching or sufficiently similar query. For example, one of the plurality of predicted queries may be selected as being similar to the second transcript if a threshold value associated with the comparison is met or exceeded.

The second transcript may be determined by combining the first audio data with the second audio data and then transcribing or combining the first transcript with the second transcript. Moreover, the second transcript may be generated based on interpreting the second audio using the first transcript. By comparing the second transcript to one of the plurality of predicted queries and selecting one of the plurality of predicted queries based on the comparison, latency may be reduced because the response has already been determined at step 308. The output may be provided by a server to a user device, by a user device to an application, etc.

Figure 4:
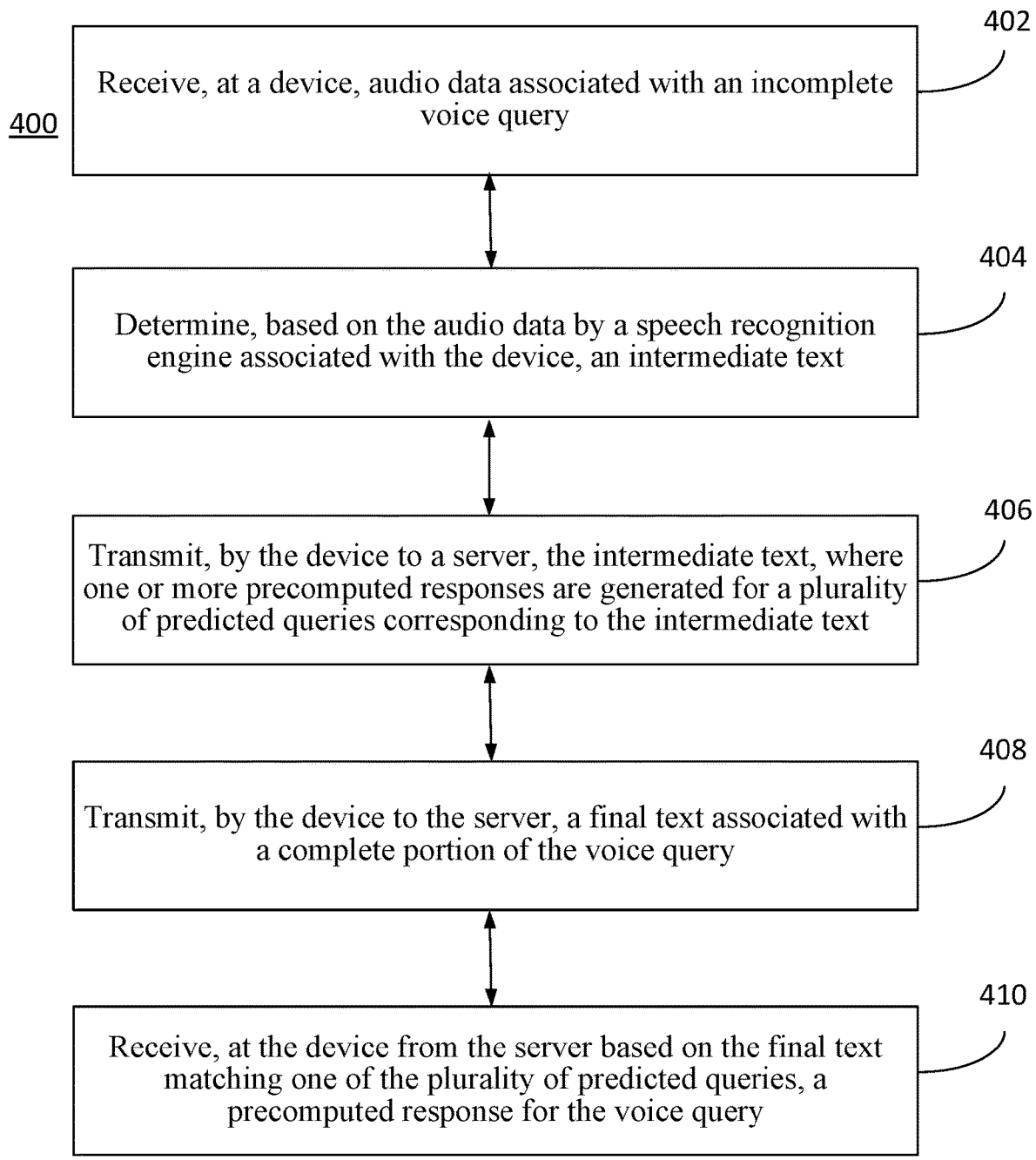
FIG. 4 shows a flow chart of an example method.

FIG. 4 shows a flow chart of an example method 400. The method 400 may be performed by a device (e.g., user device 106, computing device), one or more servers (e.g., query service 104, data service 102), or a combination thereof.

At step 402, the device may receive first audio data associated with a first portion of a voice query. The first audio data may be received at a device. The device may be a user device and the first audio data may comprise an audio file associated with a voice query from a user. The first audio data may comprise a voice command, such as buying a product, adding an item to a list, playing music, providing an answer to a question (e.g., via querying a search engine), and/or the like. The first portion of the voice query may be an incomplete voice query.

At step 404, the device may determine a first transcript. The first transcript may comprise text and may be determined based on the first audio data by a speech recognition engine associated with the device. The first transcript may be based on speech being transcribed to text in real time (e.g., or near-real time, as a query is spoken by a user, upon detection of receipt of audio associated with at least a part of a voice query). The first transcript may be an intermediate text. For example, additional text may follow the intermediate text. It may be determined that the first transcript comprises partial speech (e.g., based on a probability distribution, confidence threshold, etc.).

At step 406, the device may transmit the first transcript. The first transcript may be transmitted by the device to a server. One or more responses (e.g., precomputed responses or preprocessed responses) may be generated for a plurality of predicted queries corresponding to the first transcript. A prefix tree may be constructed for the first transcript (e.g., based on determining the first transcript comprises partial speech). The prefix tree may be constructed based on a query frequency. Moreover, a separator token may be introduced into the prefix tree. An autoregressive neural language model (NLM) may be constructed for the first transcript (e.g., one or more completions of the partial speech from the prefix tree). The autoregressive NLM may provide a string representation of one or more minimum trailing word deletions from a prefix associated with the first transcript. Moreover, a backspace token may be introduced into the autoregressive NLM. A response for each of the plurality of predicted queries may be determined by processing the plurality of the predicted queries (e.g., prior to completion of the incomplete voice query) and a final query may be compared to the plurality of predicted queries. One of the plurality of the predicted queries may be selected based on the comparison to the final query. The responses may comprise responses to one or more commands, such as a product for purchase, addition of an item to a list, control of music, one or more answers to a question (e.g., to be returned by a search engine), and/or the like.

At step 408, the device may receive second audio data associated with a second portion of a voice query. The second audio data comprise an audio file associated with a voice query from a user. The voice query may be spoken by a user and may be recorded by a microphone at the device. The voice query may comprise a voice command, such as buying a product, adding an item to a list, playing music, providing an answer to a question (e.g., via querying a search engine), and/or the like. The second portion (e.g., associated with the second audio data) may comprise the first portion (e.g., associated with the first audio data). The second portion (e.g., associated with the second audio data) may be additive to or incremental to the first portion (e.g., associated with the first audio data). The second portion of the voice query may comprise or be associated with a complete portion of the voice query. A complete portion of the voice query may comprise the first portion of the voice query and the second portion of the voice query.

At step 410, the device may determine a second transcript by the speech recognition engine. The second transcript may be determined by the device based on the second audio data. The second transcript may be based on speech being transcribed to text in real time (e.g., or near-real time, as a query is spoken by a user, upon detection of receipt of audio associated with at least a part of a voice query). The second transcript may be determined by combining the first audio data with the second audio data and then transcribing or combining the first transcript with the second transcript. Moreover, the second transcript may be generated based on interpreting the second audio using the first transcript. The second transcript may comprise a complete text. For example, no additional text may follow the complete text. It may be determined that the second transcript comprises complete speech (e.g., based on a probability distribution, confidence threshold, etc.).

At step 412, the second transcript may be transmitted by the device. The second transcript may comprise a final text associated with a complete portion of the voice query. The second transcript may be transmitted by the device to the server. The second transcript may be determined when a user of the device has stopped speaking or stopped voicing a query.

At step 414, a response for the voice query may be received. The response for the voice query may be received at the device from the server. The response for the voice query may be based on a comparison of the second transcript (e.g., a final text associated with the second portion of the voice query) to one of the plurality of predicted queries. The comparison may comprise determining the second transcript matches or is sufficiently similar (e.g., satisfies a similarity threshold) to the one of the plurality of predicted queries. The second portion of the voice query may comprise or be associated with a complete portion of the voice query. By comparing the second transcript to one of the plurality of predicted queries (see step 406) and selecting, based on the comparison, one of the plurality of predicted queries as a matching or sufficiently similar query, latency may be reduced because the responses may have already been determined for the predicted queries. The user device may perform one or more functions or outputs based on the received response. The one or more functions or outputs may comprise a purchase of an item, adding an item to a list (e.g., wish list or a shopping list), performing operations associated with a music player, providing one or more answers to a question (e.g., via a search engine), and/or the like.

Figure 5:
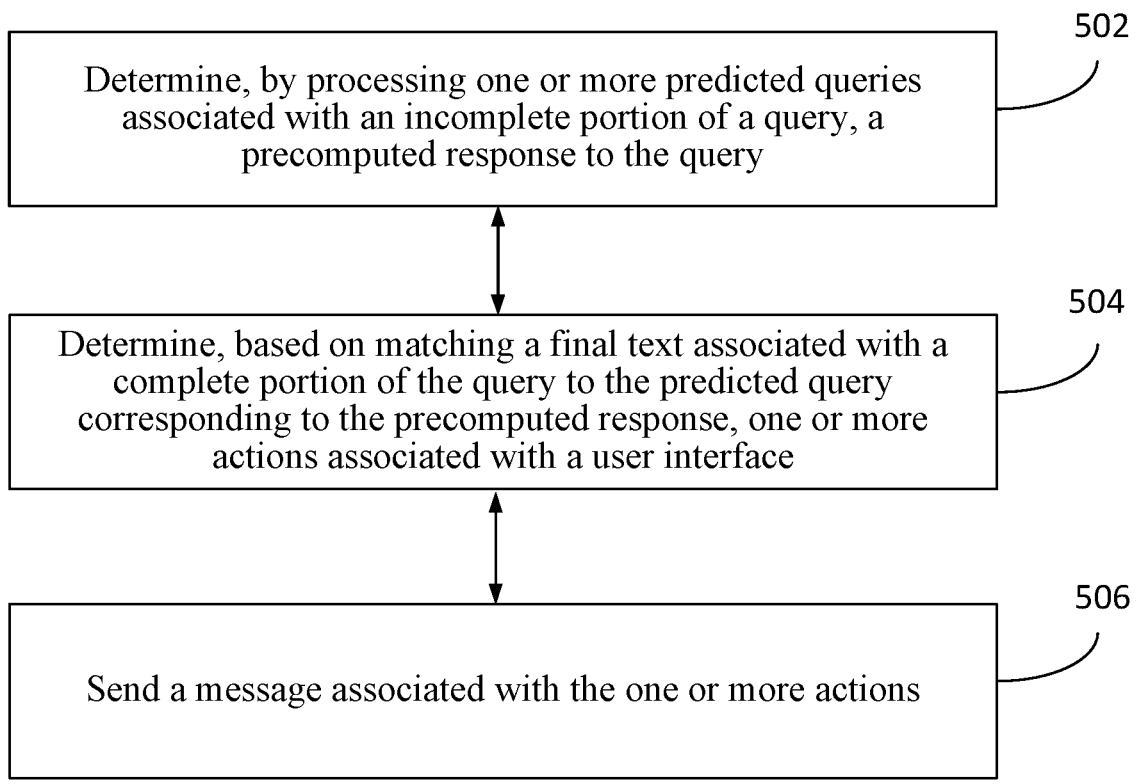
FIG. 5 shows a flow chart of an example method.

FIG. 5 shows a flow chart of an example method 500. The method 500 may be performed by a device (e.g., user device 106, computing device), one or more servers (e.g., query service 104, data service 102), or a combination thereof.

At step 502, a response (e.g., precomputed response or preprocessed response) to a query may be determined. The response to the query may be determined (e.g., prior to completion of the incomplete query) based on one or more predicted queries associated with a first portion of the query. The query may comprise a command, such as buying a product, adding an item to a list, playing music, providing an answer to a question (e.g., via querying a search engine), and/or the like. By processing the one or more predicted queries associated with the first portion of the query, processing time for a second portion of the query (e.g., a complete query) may be reduced because the final query is being processed before it is complete.

The processing of the one or more predicted queries may include construction of a prefix tree (e.g., based on determining the portion of the query is incomplete. The prefix tree may be constructed based on a query frequency. Moreover, a separator token may be introduced into the prefix tree. The processing of the one or more predicted queries may include construction of an autoregressive neural language model (NLM) (e.g., one or more completions of the incomplete portion of the query from the prefix tree). The autoregressive NLM may provide a string representation of one or more minimum trailing word deletions from a prefix associated with the incomplete portion of the query. Moreover, a backspace token may be introduced into the autoregressive NLM.

At step 504, one or more actions associated with a user interface may be determined. The one or more actions associated with the user interface may be determined based on a comparison of a final text associated with a second portion of the query to one of the one or more predicted queries (e.g., corresponding to one of the responses determined at step 502). The device may output data associated with the determined response on a display or may control one or more premises devices (e.g., a security system) or entertainment platforms (e.g., a smart television) based on the response for the query. The one or more actions may comprise a purchase of an item, adding an item to a list (e.g., wish list or a shopping list), performing operations associated with a music player, providing one or more answers to a question (e.g., via a search engine), and/or the like.

At step 506, a message associated with the one or more actions may be sent. The message may be sent by a server to a user device, by a user device to an application, etc. For example, the message associated with the one or more actions may be processed by a user device in order to perform the one or more actions. As another example, the message associated with the one or more actions may be processed by an application associated with performing the one or more actions.

Figure 6:
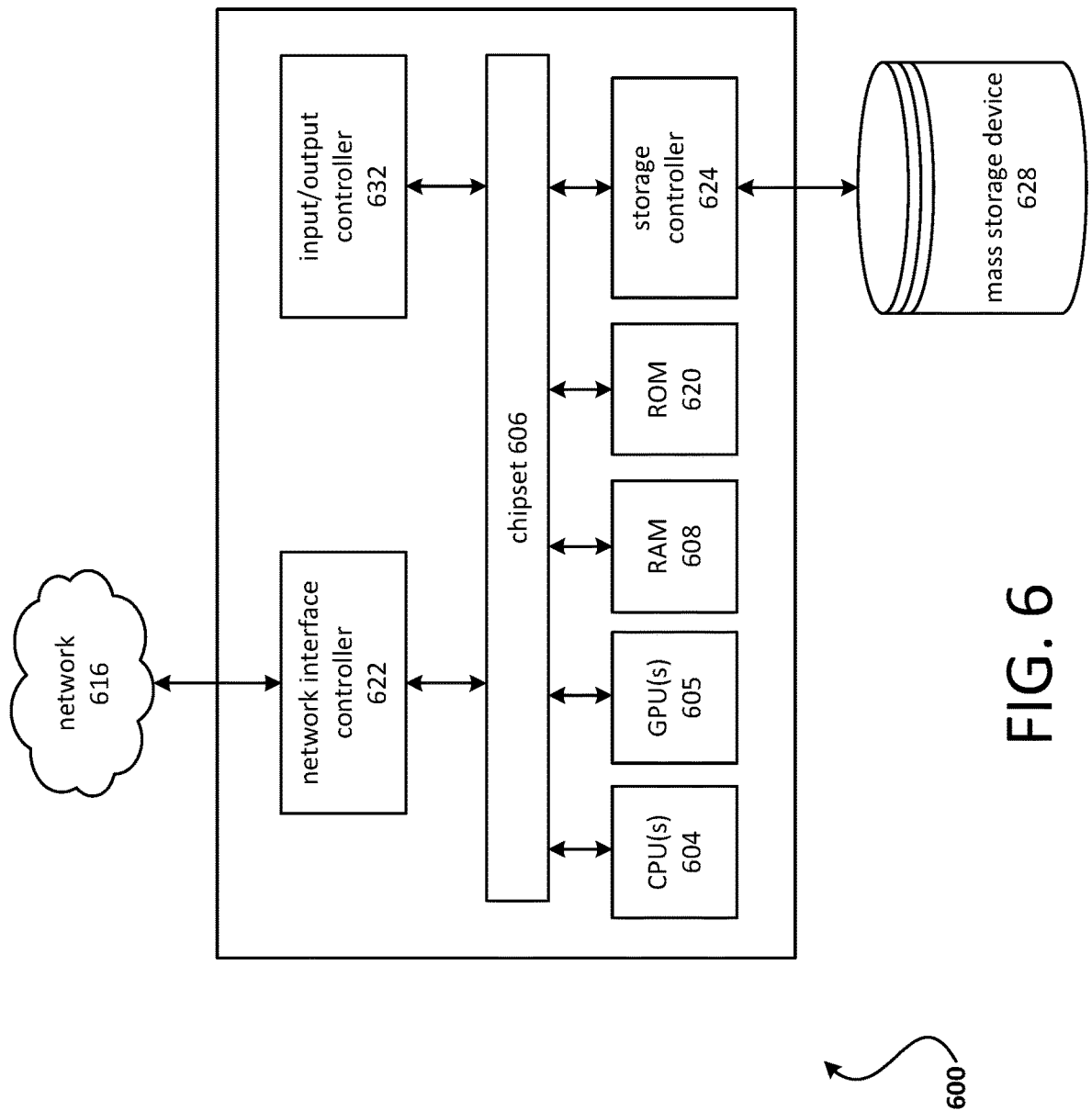
FIG. 6 shows a block diagram of an example computing device.

FIG. 6 depicts a computing device that may be used in various aspects, such as the servers, modules, and/or devices depicted in FIG. 1. With regard to the example architecture of FIG. 1, the user device 106, ASR System 120, NLP System 130, and/or NLP Cache 140 may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2, 3, 4, and 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A user interface may be provided between the CPU(s) 604 and the remainder of the components and devices on the baseboard. The interface may be used to access a random access memory (RAM) 608 used as the main memory in the computing device 600. The interface may be used to access a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein. The user interface may be provided by a one or more electrical components such as the chipset 606.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a storage device 628 that provides non-volatile storage for the computer. The storage device 628 may store system programs, application programs, other program modules, and data, which have been described in greater detail herein. The storage device 628 may be connected to the computing device 600 through a storage controller 624 connected to the chipset 606. The storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 628 is characterized as primary or secondary storage and the like.

For example, the computing device 600 may store information to the storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the storage device 628 by detecting the physical states or characteristics of one or more particular locations within the physical storage units.

In addition to the storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 628 may store other system or application programs and data utilized by the computing device 600.

The storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 2, 3, 4, and 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    receiving first audio data associated with a first portion of a voice query;
    determining, based on the first audio data, a first transcript of the first audio data;
    determining, based on the first transcript, a plurality of predicted queries;

determining, based on the plurality of the predicted queries, a response for each of the plurality of predicted queries;
receiving second audio data associated with a second portion of the voice query;
determining, based on the second audio data, a second transcript of the second audio data; and
causing output, based on comparing the second transcript of the second audio data to one of the plurality of predicted queries, of a response corresponding to the one of the plurality of predicted queries.

2. The method of claim 1, wherein the first portion of the voice query comprises an incomplete portion of the voice query and a complete portion of the query comprises the first portion of the query and the second portion of the query.

3. The method of claim 1, wherein the determining, based on the first transcript, the plurality of predicted queries is performed using one or more of an auto complete function, a machine learning model, a prefix tree, or an autoregressive neural language model (NLM).

4. The method of claim 1, wherein the first portion of the voice query comprises an incomplete portion of the voice query and the plurality of the predicted queries are processed prior to a completion of the incomplete portion of the voice query.

5. The method of claim 1, further comprising constructing a prefix tree based on a query frequency, wherein the determining, based on the first transcript, the plurality of predicted queries is performed using the prefix tree.

6. The method of claim 1, further comprising constructing an autoregressive neural language model (NLM), wherein the determining, based on the first transcript, the plurality of predicted queries is performed using the autoregressive NLM and the autoregressive NLM provides a string representation of one or more minimum trailing word deletions from a prefix associated with the first transcript.

7. The method of claim 1, further comprising determining, based on a probability distribution, that the first audio data comprises partial speech.

8. The method of claim 1, wherein the first audio data is associated with a streaming voice search.

9. A non-transitory computer-readable medium storing instructions that, when executed, cause:
receiving first audio data associated with a first portion of a voice query;
determining, based on the first audio data, a first transcript of the first audio data;
determining, based on the first transcript, a plurality of predicted queries;
determining, based on the plurality of the predicted queries, a response for each of the plurality of predicted queries;
receiving second audio data associated with a second portion of the voice query;
determining, based on the second audio data, a second transcript of the second audio data; and
causing output, based on comparing the second transcript of the second audio data to one of the plurality of predicted queries, of a response corresponding to the one of the plurality of predicted queries.

10. The non-transitory computer-readable medium of claim 9, wherein the first portion of the voice query comprises an incomplete portion of the voice query and a complete portion of the query comprises the first portion of the query and the second portion of the query.

11. The non-transitory computer-readable medium of claim 9, wherein the instructions that, when executed, cause the determining, based on the first transcript, the plurality of predicted queries, cause the determining to be performed using one or more of an auto complete function, a machine learning model, a prefix tree, or an autoregressive neural language model (NLM).

12. The non-transitory computer-readable medium of claim 9, wherein the first portion of the voice query comprises an incomplete portion of the voice query and the plurality of the predicted queries are processed prior to a completion of the incomplete portion of the voice query.

13. The non-transitory computer-readable medium of claim 9, wherein the instructions, when executed, further cause constructing a prefix tree based on a query frequency, and wherein the instructions that, when executed, cause determining, based on the first transcript, the plurality of predicted queries, cause the determining to be performed using the prefix tree.

14. The non-transitory computer-readable medium of claim 9, wherein the instructions, when executed, further cause constructing an autoregressive neural language model (NLM), and wherein the instructions that, when executed, cause the determining, based on the first transcript, the plurality of predicted queries, cause the determining to be performed using the autoregressive NLM, and further wherein the autoregressive NLM provides a string representation of one or more minimum trailing word deletions from a prefix associated with the first transcript.

15. The non-transitory computer-readable medium of claim 9, wherein the instructions, when executed, further cause determining, based on a probability distribution, that the first audio data comprises partial speech.

16. The non-transitory computer-readable medium of claim 9, wherein the first audio data is associated with a streaming voice search.

17. A device comprising:
one or more processors; and
memory storing instructions that, when executed by the one or more processors, cause the device to:
receive first audio data associated with a first portion of a voice query;
determine, based on the first audio data, a first transcript of the first audio data;
determine, based on the first transcript, a plurality of predicted queries;
determine, based on the plurality of the predicted queries, a response for each of the plurality of predicted queries;
receive second audio data associated with a second portion of the voice query;
determine, based on the second audio data, a second transcript of the second audio data; and
cause output, based on comparing the second transcript of the second audio data to one of the plurality of predicted queries, of a response corresponding to the one of the plurality of predicted queries.

18. The device of claim 17, wherein the first portion of the voice query comprises an incomplete portion of the voice query and a complete portion of the query comprises the first portion of the query and the second portion of the query.

19. The device of claim 17, wherein the instructions that, when executed, cause the device to determine, based on the first transcript, the plurality of predicted queries, cause the device to determine the plurality of predicted queries using one or more of an auto complete function, a machine learning model, a prefix tree, or an autoregressive neural language model (NLM).

20. The device of claim 17, wherein the first portion of the voice query comprises an incomplete portion of the voice query and the plurality of the predicted queries are processed prior to a completion of the incomplete portion of the voice query.

21. The device of claim 17, wherein the instructions, when executed, further cause the device to construct a prefix tree based on a query frequency, and wherein the instructions that, when executed, cause the device to determine, based on the first transcript, the plurality of predicted queries, cause the device to determine the plurality of predicted queries using the prefix tree.

22. The device of claim 17, wherein the instructions, when executed, further cause the device to construct an autoregressive neural language model (NLM), and wherein the instructions that, when executed, cause the device to determine, based on the first transcript, the plurality of predicted queries, cause the device to determine the plurality of predicted queries using the autoregressive NLM, and further wherein the autoregressive NLM provides a string representation of one or more minimum trailing word deletions from a prefix associated with the first transcript.

23. The device of claim 17, wherein the instructions, when executed, further cause the device to determine, based on a probability distribution, that the first audio data comprises partial speech.

24. The device of claim 17, wherein the first audio data is associated with a streaming voice search.

* * * * *